United States Patent [19]

Sato

[11] Patent Number: 4,814,794

[45] Date of Patent: Mar. 21, 1989

[54] APPARATUS FOR CLEANING A NOZZLE OF AN INK JET PRINTER

[75] Inventor: Onshiro Sato, Kounosu, Japan

[73] Assignee: Dai Nippon Ink and Chemicals Inc., Tokyo, Japan

[21] Appl. No.: 102,415

[22] Filed: Sep. 29, 1987

[30] Foreign Application Priority Data

Sep. 30, 1986 [JP] Japan ............................... 61-148737

[51] Int. Cl.⁴ ............................................ G01D 15/16

[52] U.S. Cl. ................................ 346/140 R; 239/112

[58] Field of Search ......................... 346/140; 239/112

[56] References Cited

U.S. PATENT DOCUMENTS

| | | | |
|---|---|---|---|
| 4,432,004 | 2/1984 | Glattli | 346/140 |
| 4,524,365 | 6/1985 | Kakeno | 346/140 X |
| 4,540,997 | 9/1985 | Biggs | 346/140 |
| 4,586,058 | 4/1986 | Yamazaki | 346/140 |
| 4,682,184 | 7/1987 | Terasawa | 346/140 |

FOREIGN PATENT DOCUMENTS

| | | |
|---|---|---|
| 3612299 | 10/1986 | Fed. Rep. of Germany . |
| 61-24457 | 3/1986 | Japan . |

*Primary Examiner*—Joseph W. Hartary

*Attorney, Agent, or Firm*—Burns, Doane, Swecker & Mathis

[57] ABSTRACT

A disposable cartridge is adapted for supplying cleaning liquid and collecting the used or waste liquid to clean a nozzle of an ink jet printer. The cartridge includes a case, a flexible, sealed bag filled with cleaning liquid, and an absorbent adapted for absorbing the waste liquid, both the bag and absorbent disposed in the case. The cleaning liquid is supplied from the bag to the ink jet nozzle to clean it, so that the amount of cleaning liquid in the bag is gradually decreased. On the other hand, the waste liquid is collected and returned to the absorbent and absorbed thereby, so that the volume of the absorbent is gradually increased.

6 Claims, 3 Drawing Sheets

APPARATUS FOR CLEANING A NOZZLE OF AN INK JET PRINTER

BACKGROUND OF THE INVENTION

1. Field of the Invention

This invention relates to an ink jet printing machine, more particularly, to an apparatus for cleaning a nozzle of such an ink jet printer, including a disposable cartridge containing a cleaning agent or liquid.

2. Description of the Related Art

Ink jet printers have become more and more sophisticated and are finding wide use in numerous fields. They enable high speed printing, use of ordinary paper for the printout, and even high speed color printing. Regarding use of ordinary paper, in particular, use may be made of various kinds of paper, since the ink jet nozzle does not come into contact with the printing media.

However, ink jet printers suffer from some problems. For example, maintenance is more difficult compared with other types of printers. Particularly, the ink jet nozzles are often clogged with ink. To overcome this problem, there have been studies conducted to improve the ink itself, but the problem of clogging has still not been completely solved.

Thus, to prevent the ink jet nozzles from clogging, the nozzles must be cleaned with a cleaning liquid when the printing operation is started or finished or during the printing operation. For this purpose, a known printer is provided with a cleaning liquid tank, which supplies cleaning liquid to the ink jet nozzles, and a waste liquid tank, which collects the used liquid after the cleaning. The printer thus must have a large space inside to accommodate these two tanks. Handling of each of these tanks, further, is troublesome.

SUMMARY OF THE INVENTION

An object of the present invention is to provide an apparatus for cleaning a nozzle of an ink jet printer, in which no large internal space is not necessary and a single vessel is used for collecting the waste or used liquid as supplying the cleaning liquid, thereby facilitating handling.

According to the present invention, to clean the nozzle of the ink jet printer, there is provided a disposable cartridge adapted for supplying cleaning liquid and collecting the used or waste liquid. The cartridge includes a case, a flexible bag filled with cleaning liquid and disposed in the case; and an absorbent adapted for absorbing the waste liquid returned to the case.

There is also provided an ink jet printer having an apparatus for cleaning an ink jet nozzle including such a cartridge; means for supplying the cleaning liquid in the flexible bag to the nozzle of the printer; and means for returning the used cleaning liquid, i.e., the work liquid, into the cartridge, where the waste liquid is absorbed by the absorbent.

There is further provided an ink jet printer having an apparatus for cleaning an ink jet nozzle including such a cartridge, the case having an opening for receiving a waste liquid pipe, and the flexible bag having a liquid discharge portion on a surface thereof, the portion being made of an elastomer and being affixed to the cartridge case so as to be exposed outside the cartridge; a printer body having a cartridge accommodation slot, the cartridge being adapted to be inserted into and pulled out from the slot, the printer body further comprising a cleaning liquid supplying means including a fixed needle, which is liquid tightly thrusted into the liquid discharge portion of the liquid bag when the cartridge is inserted into the slot, and a pump for supplying the cleaning liquid from the liquid bag via the needle to the nozzle of the printer, and a waste liquid returning means comprising the waste liquid pipe, which is received in the opening of the cartridge case when the cartridge is inserted into the slot, so that the cleaning liquid used for cleaning the nozzle is returned as waste liquid into the cartridge and absorbed by the absorbent.

According to the present invention, the cleaning liquid is supplied from the flexible, sealed bag to the nozzle of the ink jet printer to clean it, so that the amount of cleaning liquid in the flexible bag is gradually decreased. On the other hand, the used or waste liquid is collected and returned to the absorbent and absorbed thereby, so that the volume of the absorbent is gradually increased.

The cartridge of this invention contains, in a single case, the cleaning liquid and an absorbent for absorbing the waste liquid. Therefore, a large space is not necessary in the printer to accommodate such a cartridge. Also, the cartridge can easily be handled and maintained as a single unit because the waste liquid is collected and returned to the same cartridge.

DESCRIPTION OF THE PREFERRED EMBODIMENTS

Figure 1:
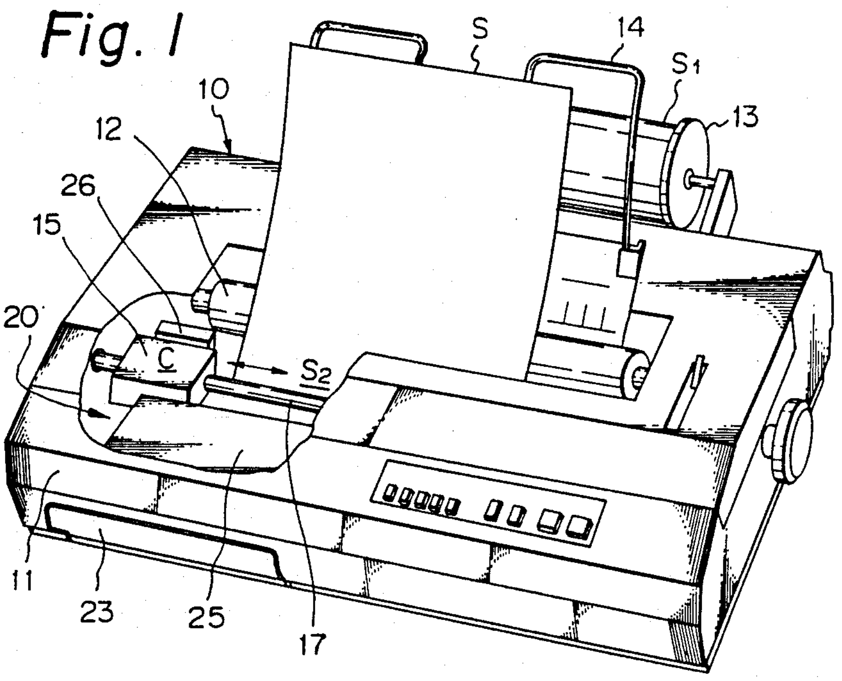
FIG. 1 is a schematic perspective view of an ink jet printer having a nozzle cleaning apparatus according to the present invention.

Referring now to FIG. 1, there is shown an ink jet printer 10 with a nozzle cleaning apparatus according to the present invention, generally indicated by reference numeral 20. The printer 10 includes a printer body 11 and, as well known, a cylindrical platen 12 for feeding a printing sheet S from a sheet stock station $S_1$ to a printing station $S_2$. In the sheet stock station $S_1$, a continuous printing sheet S is rolled on a rotatable reel 13. After printing, the sheet S is discharged along a paper guide 14.

A printing head 15 which carries some ink jet nozzles 16 (in FIG. 6, not shown in FIG. 1) is movably mounted on a guide shaft 17 arranged in parallel to the platen 12. The printing operation is performed with ink ejected from the nozzles while the printing head 15 is reciprocally moving along the guide shaft 17.

When a printing operation is started or finished, when a predetermined time period has passed, or ween a predetermined amount of printing is finished, the printing head 15 comes to the leftmost position in FIG. 1, i.e., a cleaning station C which is located at a position out of the printing station $S_2$.

Figure 2:
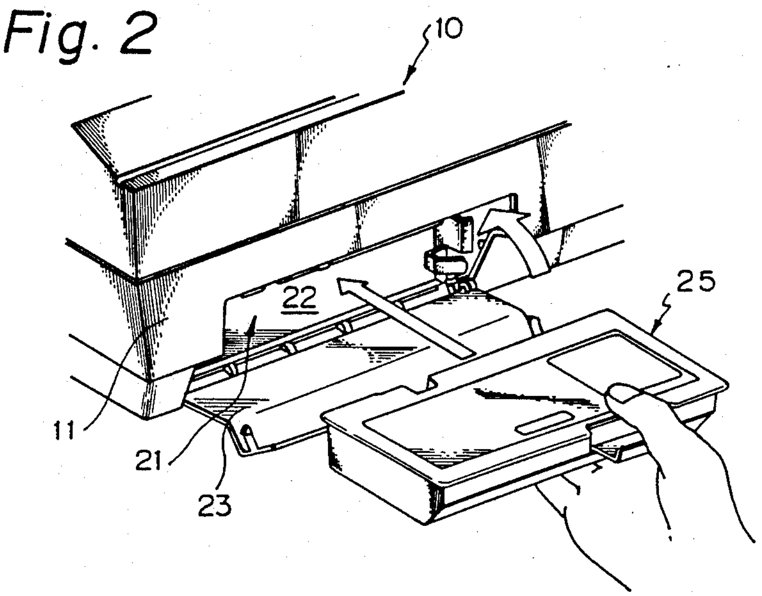
FIG. 2 is a perspective view of a cleaning liquid cartridge now inserted into the printer body.

In FIGS. 1 and 2, the nozzle cleaning apparatus 20 includes a cartridge accommodator 21 having a cartridge receiving slot 22 and a cover 23 provided at a left front portion of the printer body 11. The cover 23 can be pivotably opened to insert a cleaning liquid cartridge 25 into the slot 22, as shown in FIG. 2.

Figure 3:
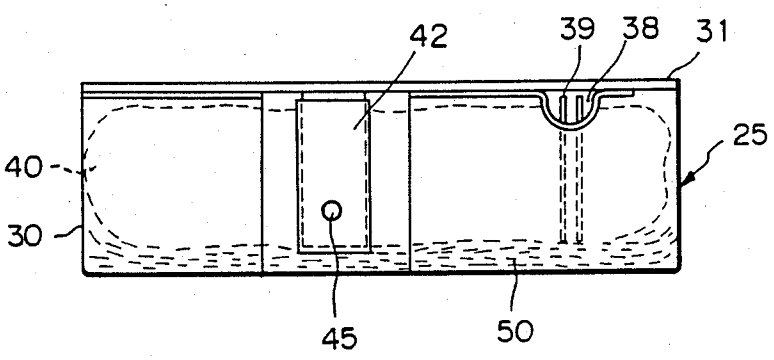
FIG. 3 is a front elevational view of the cleaning liquid cartridge according to the present invention.
Figure 4:
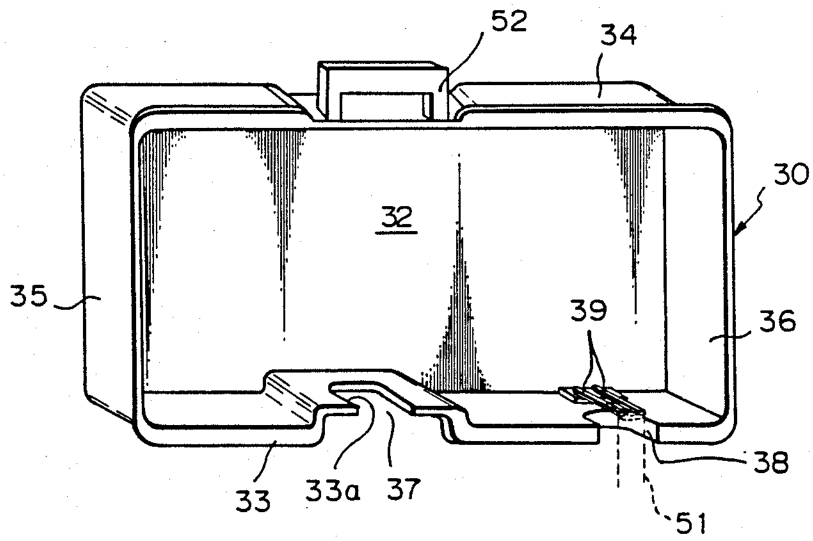
FIG. 4 is a perspective view illustrating a case of this cleaning liquid cartridge, in which a cover is removed.
Figure 5:
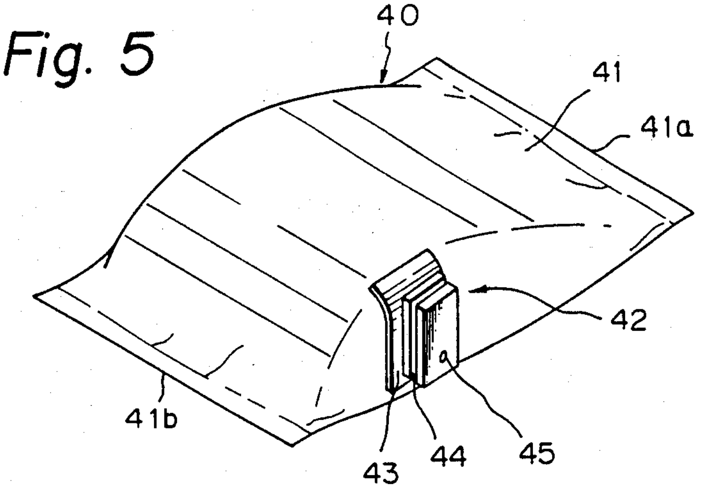
FIG. 5 is a perspective view of a bag filled with cleaning liquid.

As shown in FIGS. 3, 4, and 5, the cleaning liquid cartridge 25 includes a plastic case 30, an upper cover 31, a cleaning liquid bag 40, and an absorbent 50. The case 30 can be made of any suitable material, so long as it is inexpensive, easily shaped, and resistant to the cleaning liquid, for example, polypropylene. The case 30 has a bottom wall 32, front and rear walls 33 and 34, and side walls 35 and 36. The front wall 33 is provided with an opening 37, with which a discharge portion 42 of the liquid bag 40 is engaged, as will be mentioned later, and another opening 38 for receiving a waste liquid pipe 51. Inside the case 30 and in the vicinity of the opening 38, two parallel flexible bars 39 are extended vertically from the bottom wall 32 to the opening 38. The rear wall 34 is provided with a handle 52 which serves to facilitate inserting and pulling out the cartridge 25 to and from the slot 22 (FIG. 2). Such a case 30 can be formed as an integral plastic body by a known process.

The cleaning liquid bag 40 includes a flexible, sealed bag 41 made of this plastic, such as one consisting of an inner layer of polyethylene and an outer layer of nylon, and a liquid discharge portion 42 made of a suitable elastomer or rubber having a characteristic high resiliency, such as an ethylene-propylene copolymer. This liquid discharge portion 42 has a thin, wide base sheet portion 43 for adhering to the flexible bag 41, a peripheral groove 44 which can be inserted into or fitted to the peripheral edge 33*a* around the opening 37 in the front wall 33 of the case 30, and a blind liquid discharge hole 45. Such a cleaning liquid bag 40 is, for instance, made as follows. First, a cylindrical, tube-like flexible plastic 41 is tightly closed or heat sealed at one end 41*a* thereof. The liquid discharge portion 42 is adhered to the outer face of the flexible sheet 41. Then, the tube 41 is filled with suitable cleaning liquid and, then, tightly and sealingly closed at the other end 41*b* thereof by heat sealing. The amount of cleaning liquid may be 80 to 90 percent of the volume of the cartridge 25.

The absorbent 50 is used for absorbing the waste liquid which is returned to the cartridge 25, as will be mentioned later, and is made of a nonwoven material or paper which is processed to contain a high polymer liquid absorbing agent or is a bag of paper or nonwoven sheet packed with a liquid absorbing agent.

To form the cleaning liquid cartridge 25, the absorbent 50 is first placed in the case 30 so that it covers substantially the entire area of the bottom wall 32. Then, the cleaning liquid bag 40 is placed on the absorbent 50 and, at the same time, the peripheral groove 44 of the liquid discharge portion 42 is fitted into the peripheral edge 33*a* of the opening 37 of the case 30. The cleaning liquid bag 40 is, thus, secured to the plastic case 30, and a part of the bag 40, i.e., the liquid discharge portion 42, is exposed to the outside. Then, the upper cover 31, which is made of a plastic material, for example, similar to the case 30, is rigidly mounted on the case 30 by any known method, such as high frequency welding. The cleaning liquid cartridge 25 is thus made as a single disposable unit.

The cartridge 25 is inserted into the cartridge receiving slot 22 (FIG. 2), as mentioned before, where it is held at a predetermined position. A liquid discharge needle 53 (FIG. 6) fixedly located at a predetermined position in the printer body 11 automatically pierces the blind hole 45 of the liquid discharge portion 42, the top end of the needle 53 thrusting into the cleaning liquid bag 40. It should be noted that the resilient liquid discharge portion 42 prevents the cleaning liquid in the flexible, sealed bag 40 from leaking when the needle 53 is inserted therein. In addition, the waste liquid pipe 51 (FIG. 4), which is also fixedly located at a predetermined position in the printer body 11, is inserted into the opening 38 and comes into contact with the vertical bars 39. In this case, it should be appreciated that the two bars 39 are positioned such that at least one of them comes into contact with the top end of the pipe 51 and is flexibly bent a little thereby.

Figure 6:
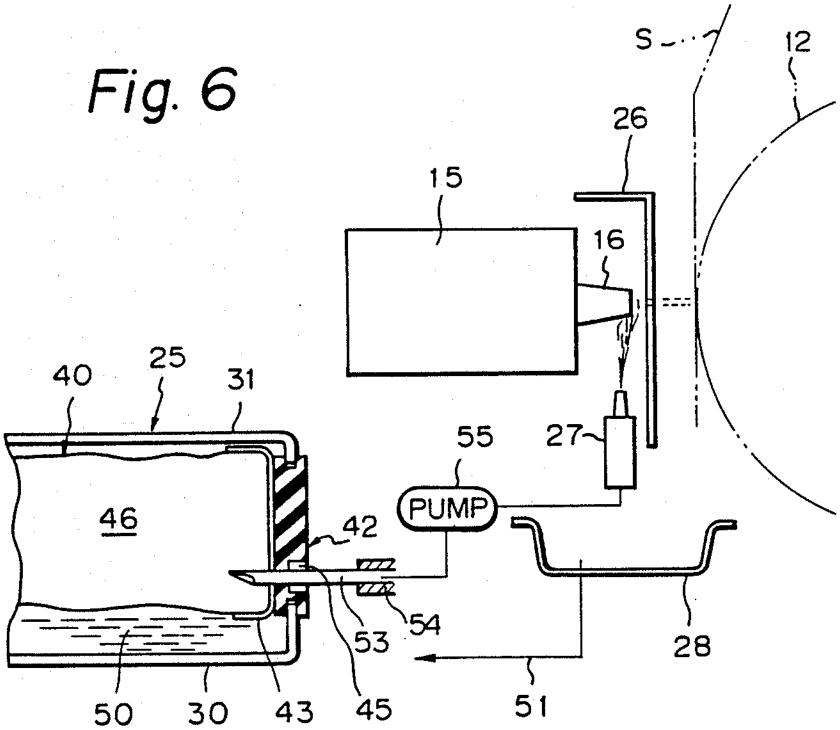
FIG. 6 illustrates a part of the cartridge, in cross-section, and also illustrates a block diagram showing a flow of the cleaning liquid.

In FIG. 6, the liquid discharge needle 53 is connected via a feed pipe 54 and a pump 55 to an injector 27, so that the cleaning liquid 46 in the bag 40 is sucked by the pump 55 and fed to the injector 27, which is located in the cleaning station C, to inject the cleaning liquid toward the ink jet nozzle 16 of the printing head 15.

Thus, when a printing operation is started or finished, or during the printing operation, the printing head 15 moves to the cleaning station C (FIG. 1) and, then, the pump 55 is actuated to perform the nozzle cleaning operation. The nozzle 16 is, thus, cleaned by the cleaning liquid injected from the injector 27, so that it is effectively prevented from being clogged with ink.

A shelter cover 26 is arranged in the cleaning station C to cover the ink jet nozzle 16 and to prevent the injected cleaning liquid from scattering therearound. The shelter cover 26 also facilitates collection of the used waste liquid in a tray 28 arranged under the cover 26 and nozzle 16.

The waste liquid collected in the tray 28 is returned to the cartridge 25 via the pipe 51, which is in contact with the vertical bars 39 in the cartridge 25. The waste liquid flowing out of the pipe 51 is, therefore, picked up by the vertical bars 39 and flows downward therealong to the bottom of the cartridge 25 and is absorbed by the absorbent 50.

Thus, the amount of the cleaning liquid in the cleaning liquid bag 40 is gradually decreased, i.e., the volume of the bag 40 becomes smaller and smaller. On the other hand, the volume of the absorbent 50 is gradually increased by absorption of the waste liquid. When the cleaning liquid in the bag 40 is exhausted, the old cartridge 25 should be pulled out of the slot 22 and changed for a new cartridge. The old cartridge 25 may be simply disposed.

I claim:

1. An ink jet printer having an apparatus for cleaning an ink jet nozzle comprising:

a disposable cartridge comprising a case, a flexible, sealed bag filled with a cleaning liquid, and an absorbent adapted for absorbing waste liquid, said absorbent and said bag being disposed in said case as under and upper layers, respectively;

said case including a front wall having a first opening for receiving a waste liquid pipe and a second U-shaped opening;

said bag having a liquid discharge portion on a surface thereof, said portion being made of an elastomer having a peripheral groove fitted to a peripheral edge around said U-shaped opening, so that said liquid discharge portion is fixed to said cartridge case so as to be exposed outside the cartridge;

said case being fixedly covered by an upper cover so as to constitute a single disposable unit;

a printer body having a cartridge accommodation slot, said cartridge being adapted to be inserted into and pulled out from said slot;

said printer body further comprising a cleaning liquid supplying means including a fixed needle, which is liquid tightly thrust into said liquid discharge portion of the liquid bag when said cartridge is inserted into said slot, and a pump for supplying the cleaning liquid from said liquid bag via said needle to the nozzle of the printer, and a waste liquid returning means comprising said waste liquid pipe, which is received in said first opening of said cartridge case when said cartridge is inserted into said slot, so that the cleaning liquid used for cleaning the nozzle is returned as waste liquid into the cartridge and absorbed by said absorbent; and, said cartridge case being provided therein and adjacent to said first opening with at least one guide bar, which comes into contact with said waste liquid pipe when said cartridge is inserted into said slot, to guide the waste liquid from said pipe to said absorbent.

2. An ink jet printer as set forth in claim 1, wherein said flexible bag is made of thin plastic, such as polyethylene or nylon.

3. An ink jet printer as set forth in claim 1, wherein said absorbent is made of nonwoven material or paper which has been processed to contain high polymer liquid absorbing agent or a bag of paper or nonwoven sheet packed with a liquid absorbing agent.

4. A disposable cartridge adapted for supplying a cleaning liquid and collecting the used or waste liquid to clean a nozzle of an ink jet printer, said cartridge comprising;

a case, a flexible sealed bag filled with said cleaning fluid, and an absorbent adapted for absorbing said waste liquid;

said absorbent and said bag being disposed in said case as under and upper layers, respectively;

said case including a front wall having a first opening adapted for receiving a waste liquid pipe in said printer and a second U-shaped opening;

said case being provided therein and adjacent to said first opening with at least one guide bar, adapted to come into contact with said waste liquid pipe, for guiding the waste liquid from said pipe to said absorbent;

said bag having a liquid discharge portion on a surface thereof, said portion being made of an elastomer having a peripheral edge around said U-shaped opening, so that said liquid discharge portion is fixed to said cartridge case so as to be exposed outside the cartridge; and said case being fixedly covered by an upper cover so as to constitute a single disposable unit.

5. A disposable cartridge as set forth in claim 4, wherein said flexible bag is made of thin plastic, such as polyethylene or nylon.

6. A disposable cartridge as set forth in claim 4, wherein said absorbent is made of nonwoven material or paper which has been processed to contain high polymer liquid absorbing agent or a bag of paper or nonwoven sheet packed with a liquid absorbing agent.

* * * * *